United States Patent [19]

Hamilton, Jr.

[11] Patent Number: 5,456,733
[45] Date of Patent: Oct. 10, 1995

[54] PELLETIZED MULCH COMPOSITION AND PROCESS FOR PREPARING SAME

[75] Inventor: George W. Hamilton, Jr., State College, Pa.

[73] Assignee: The Penn State Research Foundation, University Park, Pa.

[21] Appl. No.: 354,670

[22] Filed: Dec. 13, 1994

Related U.S. Application Data

[63] Continuation of Ser. No. 118,380, Sep. 8, 1993, abandoned.

[51] Int. Cl.$^6$ .............................. A01C 1/00; C09K 17/00
[52] U.S. Cl. ........................................... 47/58; 47/9
[58] Field of Search .................. 47/58, 9, 1.01, 47/DIG. 10

[56] References Cited

U.S. PATENT DOCUMENTS

| | | | |
|---|---|---|---|
| 3,812,615 | 5/1974 | Jamison | 47/9 |
| 3,973,355 | 8/1976 | McKenzie | 47/37 |
| 5,082,563 | 1/1992 | Webb et al. | 210/631 |

*Primary Examiner*—David T. Fox
*Assistant Examiner*—Elizabeth McElwain
*Attorney, Agent, or Firm*—Thomas J. Monahan

[57]              ABSTRACT

Process for producing novel mulching pellets from waste paper scrap by incorporating particulate water-insoluble, swellable, gel-forming polymer into the pellet-forming composition. The formed pellets swell and disintegrate after being spread and impregnated with water, to increase their area of ground-coverage, to release any included nutrients or seeds, and to deposit polymer particles having water-absorbing properties.

22 Claims, No Drawings

5,456,733

PELLETIZED MULCH COMPOSITION AND PROCESS FOR PREPARING SAME

This is a continuation of application Ser. No. 08/118,380 filed on Sep. 8, 1993, now abandoned.

BACKGROUND OF THE INVENTION

1. Field of the Invention

Mulching is the practice of applying foreign materials to a seedbed to reduce erosion and provide a more favorable microenvironment for seed germination and seedling development. On level planting beds where the capability for frequent irrigation exists, mulching may not be necessary during propagation. However, mulching can enhance germination and it is almost essential on sloping sites or where moisture availability largely depends on natural rainfall.

An effective mulch serves several functions: it stabilizes the soil and seed against water and wind erosion; it moderates temperature fluctuations at the soil surface and thus protects germinating seeds and seedlings from temperature-induced injury; it reduces evaporation of moisture from the soil surface and provides a more humid microenvironment in and directly above the soil surface, and it dissipates the energy of falling water droplets from rainfall and irrigation to reduce crust formations at the soil surface and thus water infiltration rates are not decreased. Not all mulches serve all of these functions; some are more effective than others, and selection of a particular material depends on the specific requirements at each site and the cost and local availability of materials.

2. Discussion of the Prior Art

For decades, one of the most widely used mulches has been straw, primarily from wheat plantings. Applied at a rate of 1.5–2.0 tons per acre, it provides acceptable results. Weed-free straw should be used, and as long as coverage is not too heavy (not more than 50 percent soil coverage), the straw need not be removed after seedling emergence.

Grassy hay is similar to straw in its effectiveness as a mulch. Early-season cuttings of hay are preferred, as they are less likely to contain substantial populations of weed seeds.

Straw and hay can be applied by hand to small sites. In windy areas, they should be stabilized by crisscrossing the area with binder twine anchored down with stakes. Application to large sites is usually accomplished by using a mechanical mulch blower. This machine chops the material and blows it over the seedbed. An asphalt binder is usually sprayed on the mulch as it exits the blower, or after application, to stabilize the mulch on the seedbed. The same technique can be used for loose wood mulches and organic residues. Typically straw contaminates the seedbed with weed seeds and depletes the seedbed of nitrogen, due to the high C:N ratio of straw.

Hydro-mulch is another mulch commonly used for turfgrass establishment. Hydro-mulch can be made from virgin wood fibers, waste paper fiber from various industries, or newsprint. Although hydro-mulch can be stored and is weed free, it requires the use of a hydro-mulcher, which is an expensive piece of equipment, for application. Hydro-mulching also requires the availability of a very large water source, near the application site, to service the hydro-mulching process.

Reference is made to U.S. Pat. No. 3,269,824 which discloses a process for repulping waste paper of various types into a slurry, adding thereto fertilizer minerals including nitrogen, potassium, phosphorous, etc., drying under vacuum and stamping into dense pellets useful for application as a mulch. Repulping a waste paper requires large amounts of water and expensive equipment, and produces large volumes of contaminated waste water. Also the densified pellets require large amounts of absorbed moisture before expanding to increase ground coverage and to release nutrients.

Reference is also made to U.S. Pat. No. 4,339,890 which discloses a dry seeding hydro-mulch containing shredded or ground particles of waste paper and dry wetting agent, which is sprayed onto the soil after mixing it with water in a hydro-mulcher. Such equipment is expensive and requires access to substantial amounts of water.

Reference is also made to U.S. Pat. No. 4,369,597 which relates to the formulation of pelletized mint mulch suitable for application as a hydro-mulch or in dry form, and which discusses the disadvantages of the waste paper mulch pellets of U.S. Pat. No. 3,269,824, discussed supra. Finally, reference is made to U.S. Pat. Nos. 4,123,489; 4,625,679; 4,813,996 and 5,195,465 for their disclosure of processes for pelletizing waste paper particles containing soil nutrients and other ingredients for various uses including soil additives and mulches.

SUMMARY OF THE INVENTION

The present invention provides a novel, economical and ecological process for producing inexpensive and efficient dry mulching pellets containing particulate waste paper and a swelling agent, capable of application by means of simple spreading devices and being highly water-absorbent and water-retentive. Upon impregnation with applied water or rain, the present pellets swell, expand and disintegrate to increase their area of ground coverage and provide a water-absorbing surface covering which prevents water run-off and which helps maintain moisture in the soil. The disintegration or coming-apart of the swollen pellets also increases the exposed surface area of the mulch and facilitates the release of seed and the release of nutrients, if present in the pellets, into the soil to support the germination and growth of seed and plants in the soil.

The most essential feature of the process and mulch pellets of the present invention is the incorporation of a swelling agent comprising a water-insoluble, swellable, gel-forming, hydrophilic polymeric material, capable of absorbing substantial amounts of water, into pellets comprising waste paper particles.

DETAILED DESCRIPTION

The present invention aids the environment by recycling paper products back into the soil, rather than depositing them in landfills or incinerating them. This is made possible by the discovery of a process for producing mulch pellets which consist nearly entirely of particulate waste paper and which contain a minor amount by weight, up to about 10%, most preferably between about 2% and 5%, of a water-soluble, film-forming, polymeric binder material, and a minor amount be weight, up to about 10%, most preferably between about 2% and 5%, of a swelling agent comprising a water-insoluble, water-swellable, gel-forming, hydrophilic polymeric material in particulate form, distributed throughout the pellets.

A principal advantage of the present invention is the ability to use, and recycle, substantial volumes of inexpensive waste paper to produce an advantageous mulch product which can be applied to the soil by a simple and cost-effective spreading process. While waste paper has been shredded and pelletized, per se, such pellets do not provide a suitable mulch because they remain on the soil surface as dense discrete pellets which do not swell and burst or disintegrate to form a good ground cover even after being soaked with water. If applied in sufficient density to cover the surface of the soil against wind or runoff, they smother the soil and prevent desired growth. If applied in reduced density to permit the desired growth they are ineffective in reducing soil erosion and weed growth.

The present invention overcomes these problems by the discovery that the addition of a small amount of a water-insoluble, water-absorbing, gel-forming polymer into the pellet-forming particulate paper composition transforms the dense pellets into pellets which absorb substantial amounts of water, independently of the water-absorbing properties of the paper itself. This causes the moist pellets to swell and expand apart or burst and disintegrate to reduce their density and substantially-increase their ground-coverage and their mulching ability while, at the same time, donating a valuable hydrated soil additive which remains effective for the storage and release of water near the surface of the soil to assist in seed germination and plant growth.

The present mulch pellets comprise up to about 99% by weight of particulate waste paper, preferably newsprint, which contains a small amount by weight of a water-soluble film-forming binder material such as polyvinyl alcohol and/or a cellulosic binder material such as carboxymethyl cellulose to bind the wood fibers in the paper-making process. Thus the addition of more water-soluble binder materials generally is not necessary.

The essential additive to the present particulate paper pellet-forming compositions is the water-insoluble, water-swellable, gel-forming hydrophilic polymer which is uniformly mixed in powder form, in a horizontal mixer, with the particulate paper, a small amount of water if needed, and optionally, other nutrients, seeds, dyes and/or other optional additives. The composition is fed to a conventional pellet mill, pelletized, and air-dried to a water-content below about 10% by weight.

Gel-forming hydrophilic polymer particles are well-known soil additives to impart water-holding and water-releasing properties to soil, turf and potting mixtures. Reference is made to cross-linked polyacrylamide polymers commercially-available from Broodleaf Industries, Inc., San Diego, Calif. under the registered trademark "P4" which are superabsorbent particles having a gel capacity of about 200, i.e., capable of absorbing water up to about 200 times their own weight. Similar cross-linked polyacrylate polymers are used in particulate form as gel-forming, aqueous liquid-retaining materials in diapers and related products.

Reference is made to U.S. Pat. No. 3,973,355 which discloses the incorporation of up to about 5% by weight of a variety of particulate water-insoluble, water-swellable, cross-lined polymers in a plant growth foam, which polymers are suitable for use in powder form as swelling agent additives to the present waste paper pellets. In general gel-forming polymers having a gel capacity of at least about 20 and up to about 700 are suitable.

The preferred waste paper for use according to the present invention is ordinary newsprint, which is a non-phytotoxic waste product which is widely-available in most parts of the world. Other non-phytotoxic waste paper products such as magazines and paperboard are also useful but may require additional processing to reduce excessive amounts of undesirable fillers such as clay and other ingredients which may be harmful to soil, seeds or plants.

The present pellet-forming compositions are formed from raw waste paper, preferably newsprint, which is hammer-milled to reduce it to fine particulate size, i.e., less than about ¼ inch in any direction, and stored in a fluff bin. For pelletization, the particulate waste paper is misted with water, if needed, which may include a conventional wetting agent and a water soluble binder material, to provide a water content of about 15% by weight, necessary to enable the particulate paper composition to bind and hold together in pellet form. A portion of the included water is exuded and lost during pelletization, and another portion of the water is removed during final air-drying of the pellets, prior to bagging. The final water-content of the bagged pellets should be below about 10% by weight of water, bound by the swelling agent. Larger amounts of included water can cause the pellets to develop mold in the bags and/or to come apart or swell prematurely.

The hammermilling or cutting of waste paper into small pieces suitable for pelletization, and processes and pellet mills for the pelletization of such paper pieces are well known in the art. Reference is again made to U.S. Pat. Nos. 4,123,489; 4,625,679; 4,813,996 and 5,195,465 for their disclosures of processes and machines for shredding, cutting and/or hammermilling of waste papers, including newsprint, and for the processing and pelletizing thereof for a variety of uses. In effect, the present invention involves the uniform incorporation of small amounts of powdered water-absorbing, gel-forming polymers into such pellet-forming compositions to produce pellets which provide excellent mulching properties in that they can be spread or broadcast over the soil as discrete pellets which swell and open or disintegrate when wetted, to substantially increase their extent of ground coverage and provide a mulch having the ability to absorb and to release water over a long period of time.

Greenhouse studies were conducted to evaluate the present pellet performance. Flats were filled with soil and then seeded with Kentucky bluegrass. Different batches of identical pellets were applied to different flats at 44, 88 and 176 lb/1000 ft, for comparison with other identical flats to which no mulch pellets were applied. The flats were placed under a rainfall simulator and irrigated with 1", 2.5", or 5" of water. Significant flooding did occur in many flats at the higher irrigation rates and seed floating was observed on many flats. The flats were placed in a greenhouse and irrigated at different intervals, selected to permit drying of the soil surface.

Plant densities were determined in the various flats by counting individual grass plants per unit area. Plant densities are important when considering overall turf quality. Increased plant densities provide increased soil surface protection and soil stabilization, both of which help prevent erosion. Plant density is also important to create good competition to prevent infestations of pests and allow for the turf stand to recover from different types of stress.

Individual tillers (grass plants) were counted in a 36 sq. in. area of each flat. Data are averages of three replications and were as follows:

| Mulch Rate (lb/M sq ft) | Initial Watering (inch) | Watering Interval (days) | #Tillers |
| --- | --- | --- | --- |
| 0 | 2.5 | 2 | 162 |
| 44 | 2.5 | 2 | 140 |
| 88 | 2.5 | 2 | 261 |
| 176 | 2.5 | 2 | 267 |
| 0 | 5 | 2 | 86 |
| 44 | 5 | 2 | 172 |
| 88 | 5 | 2 | 233 |
| 0 | 1 | 4 | 45 |
| 44 | 1 | 4 | 117 |
| 88 | 1 | 4 | 157 |
| 0 | 2.5 | 4 | 45 |
| 44 | 2.5 | 4 | 73 |
| 88 | 2.5 | 4 | 130 |
| 176 | 2.5 | 4 | 102 |
| 0 | 1 | 8 | 29 |
| 44 | 1 | 8 | 220 |
| 88 | 1 | 8 | 275 |
| 0 | 2.5 | 8 | 67 |
| 44 | 2.5 | 8 | 88 |
| 88 | 2.5 | 8 | 106 |
| 176 | 2.5 | 8 | 247 |

This data indicates that the rate of much had a direct effect on the seedling germination and survival. As the rate of mulch increased, the number of tillers increased. Second, the mulch had a much more apparent effect on the seedling survival as the days in between waterings increased. This is expected since one of the purposes of mulch is to prevent the soil surface from drying out and to retain moisture.

It will be apparent to those skilled in the art that the present pellets can be produced in various sizes and densities provided that they can be spread conveniently and will swell and disintegrate immediately upon being impregnated with water. Newsprint generally has a density of 4 to 7 lbs. cu. ft. and, when pelletized according to the present invention, produces pellets having a density of 35–45 lbs/cu. ft., depending upon pellet size. Preferably the present pellets are cylindrical and have a diameter of between about ⅛ and ¼ inch and a length of between about ⅛ and ½ inch. Various wetting agents, dyes, aqueous or dry fertilizers, seeds and other components can be included in the present pellets, as will be apparent to those skilled in the art.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. Process for producing mulching pellets from waste paper, comprising the steps of reducing said waste paper to finely-divided particle form, uniformly dispersing therein at least 2% by weight of a particulate water-insoluble, water-absorbing, swellable, cross-linked acrylic, gel-forming polymer to form a pellet-forming composition containing a minor amount by weight of water, pelletizing said composition, and drying to form discrete pellets which contain less than about 10% by weight of water and which swell and rupture when impregnated with water.

2. Process according to claim 1 in which said waste paper includes a minor amount by weight of a water-soluble film-forming binder material.

3. Process according to claim 1 in which said waste paper comprises newsprint.

4. Process according to claim 1 in which said particulate gel-forming polymer comprises a powdered cross-linked acrylic polymer.

5. Process according to claim 1 in which said gel-forming polymer is present in an amount up to about 10% by weight of the pellet-forming composition.

6. Process according to claim 5 in which the amount of the gel-forming polymer is between about 2% and 5% by weight of the pellet-forming composition.

7. Process according to claim 1 in which the formed pellets are cylindrical and have a diameter between about ⅛ inch and ¼ inch, and have a length between about ⅛ and ½ inch.

8. Mulching pellets capable of swelling and rupturing when impregnated with water, said pellets comprising over 90% by weight of finely-divided waste paper having uniformly dispersed therein from about 2%, up to about 10% by weight, of a particulate, water-insoluble, water-absorbing, swellable, cross-linked acrylic, gel-forming polymer.

9. Mulching pellets according to claim 8 in which said waste paper includes a minor amount by weight of a water-soluble film-forming binder material.

10. Mulching pellets according to claim 8 in which said waste paper comprises newsprint.

11. Mulching pellets according to claim 8 in which said gel-forming polymer comprises a cross-linked acrylic polymer in powdered form.

12. Mulching pellets according to claim 8 in which said gel-forming polymer is present in an amount between about 2% and 5% by weight of the total composition.

13. Mulching pellets according to claim 8 comprising cylindrical pellets having a diameter between about ⅛ inch and ¼ inch and having a length between about ⅛ inch and ½ inch.

14. Process according to claim 1 in which said gel-forming polymer comprises a cross-linked polyacrylamide polymer having a gel capacity of between about 20 and 700.

15. Mulching pellets according to claim 8 in which said gel-forming polymer comprises a cross-linked polyacrylamide having a gel capacity of between about 20 and 700.

16. Process for providing a water-absorbing ground soil surface covering which prevents water run-off and helps maintain moisture in said ground soil to support a germination and growth of seeds and plants present in the soil, comprising applying over said ground soil a plurality of mulching pellets capable of swelling and rupturing when impregnated with water, said pellets comprising over 90% by weight of finely-divided waste paper having uniformly dispersed therein from about 2%, up to about 10% by weight, of a particulate, water-insoluble, water-absorbing, swellable, cross-linked acrylic, gel-forming polymer.

17. Process according to claim 16 in which said waste paper includes a minor amount by weight of a water-soluble film-forming binder material.

18. Process according to claim 16 in which said waste paper comprises newsprint.

19. Process according to claim 16 in which said particulate gel-forming polymer comprises a powdered crosslinked acrylic polymer.

20. Process according to claim 16 in which said gel-forming polymer is present in an amount between about 2% and 5% by weight of the total composition.

21. Process according to claim 16 in which said pellets comprise cylindrical pellets having a diameter between about ⅛ inch and ¼ inch and a length between about ⅛ inch and ½ inch.

22. Process according to claim 16 in which said mulching pellets are applied at a rate between about 44 and 176 lb/1000 square feet of ground soil surface area.

\* \* \* \* \*